United States Patent [19]

Cipolli et al.

[11] 4,062,645

[45] Dec. 13, 1977

[54] ACID DYES USEFUL FOR DYEING STREAKED NYLON

[75] Inventors: Roberto Cipolli, Novara; Giampiero Pieri, Saronno (Varese); Camillo Paffoni, Pogno (Novara), all of Italy

[73] Assignee: Montedison S.p.A., Milan, Italy

[21] Appl. No.: 678,911

[22] Filed: Apr. 21, 1976

[51] Int. Cl.² ............... C09B 29/38; D06P 1/06; D06P 3/24

[52] U.S. Cl. .................. 8/41 B; 260/163; 8/178 R

[58] Field of Search .......... 260/163; 8/41 B, 62,178 R

[56] References Cited

U.S. PATENT DOCUMENTS 3,485,572  12/1969  Taube et al. ..................... 8/62

Primary Examiner—Floyd D. Higel
Attorney, Agent, or Firm—Hubbell, Cohen, Stiefel & Gross

[57] ABSTRACT

The known compounds of the formula:

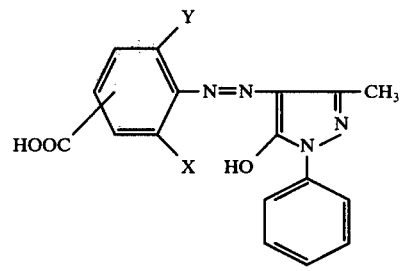

wherein X is hydrogen or bromine, Y is hydrogen, chlorine, bromine or methyl and the -COOH group is meta or para to the azo group have been found to be useful in uniformly dyeing polyamide fibers to a yellow shade.

1 Claim, No Drawings

ACID DYES USEFUL FOR DYEING STREAKED NYLON

BACKGROUND OF THE INVENTION

1. Field of the Invention

The invention relates to the acid dyeing of polyamide fibers and fabrics made therefrom.

2. Prior Art

The dyestuffs used in the process according to the invention are known materials and are described in U.S. Pat. No. 3,485,572 as well as in West German Pat. No. 1,932,828, published Jan. 7, 1971.

The present invention relates to the use of the known yellow dyestuff having the formula:

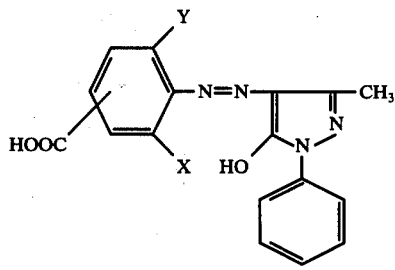

wherein X, Y and the COOH group configuration are as defined above, for dyeing polyamide fibers. These dyestuffs are scarcely water-soluble, are free of sulphonic groups and have a carboxylic acid chain.

As is known, one of the typical characteristics of artificial and chemical fibers is the good dyeability of the articles manufactured therefrom. In the field of polyamide fibers in particular, perfectly uniform dyeing are difficult to obtain, since variations of physical or chemical nature inherent in the fiber substantially affect the tinctorial uniformity. The tinctorial defects which result are usually called "streaks" or barrinesses.

Generally, a dyeing is required to exhibit uniformity and good stability characteristics. These two properties, apart from the fastness to light, are not always simultaneously provided by a given dyestuff, especially with regard to polyamide fibers; indeed, in this connection it might even be said that the faster a dyestuff, the less equalizing or levelling is the dyeing and vice-versa.

For these fibers, and in particular for polyamides, dispersed and anionic dyes, suitably selected for obtaining well defined shades (yellow in the present case) are generally employed. The dispersed dyes (e.g. Microsetile — ACNA) may be usefully employed for obtaining pale color shades, as they possess a high equalizing power with respect to coverage of streaks in the fibers being dyes. When preparing dyeings of middle or full color shades, what must be borne in mind (in addition to the practical impossibility of obtaining very intense shades with these dyestuffs) is the low stability of these dyeings to wet-treatments.

Selected anionic dyestuffs (e.g. Nailamide — ACNA) offer good possibilities for obtaining dark color shades, scarce possibilities for middle color shades, and they are generally unsuited for providing pale color shades owing to their insufficient equalizing power.

The use of auxiliary agents of the anion-active type (e.g. Dispergal FP Trademark of a Montedison product), cation-active type (e.g. Dispersol CWL Trademark of a Montedison product) or non-ionic type when effecting the dyeing, leads to some improvements for the middle color shades, but well-equalized pale shades are never quite obtainable when using these dyestuffs, even with said auxiliary agents.

SUMMARY OF THE INVENTION

It has now been found that polyamide fiber fabrics, even those that are very streaked, are uniformly dyed yellow in a boiling aqueous bath, the pH of which ranges from alkaline to slightly acid (even in the absence of the above auxiliary agents), by using the known dyestuffs having the formula:

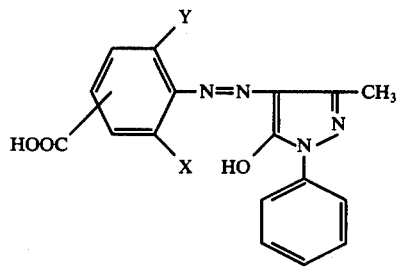

wherein: X is hydrogen or bromine, Y is hydrogen, chlorine, bromine or methyl, and the carboxylic group is meta or para with respect to the azo group.

The thus obtained dyeing are always perfectly equalized, independently of their strength, and reveal excellent general fastnesses, particularly to wet-treatments.

By comparing the dyestuffs according to the present invention with other known dyes that provide the best results with regard to equalizing power, in particular, with Yellow Nailamide ER, C.I. Acid Yellow 25, No. 18835, it has been surprisingly found that the dyestuffs according to the invention exhibit a substantially superior equalizing power as regards coverage of the streaks, revealing at the same time good general fastnesses, particularly to wet-treatments.

From a comparison between the use of the dyestuffs according to the invention and that of the dispersed dyes suitable for dyeing polyamide fibers, such as, for example, Yellow Microsetile 5R, C.I. Disperse Yellow 7, No. 26090, it has been found that the dyestuffs of the invention permit one to achieve (the equalizing powers being the same) a better fastness to wet-treatments, while still retaining a very high degree, the other general stabilities. A further important characteristic of the dyestuffs used in accordance with the process of the invention is the obtainment of particularly intense color shades.

It has been ascertained that, at the same concentration, the strength of the dyeings provided by the present dyestuffs exceeds the strength provided by the dispersed dyes known in the art. Such strength is of the same order of magnitude for full color shades, as the strength provided by the anionic dyestuffs which are scarcely equalizing with respect to the coverage of streaks in the fibers or fabrics.

With regard to the process of the invention, the best results are achieved by a process comprising a first slightly alkaline step; it is desirable to use systems buffered with borates and phosphates, which permit one to start dyeing at pH values equal to 8.5 – 9 and to successively lower the pH to a final slightly acid pH value of 5 – 5.5, by the gradual addition of organic acids, according to conventional techniques. For pale color shades, dyeing is preferably completed at a pH value equal to 6–6.5.

This procedure enables one to attain the best migrating and equalizing power without substantially depressing the affinities of the dyestuffs for the fibers or fabrics.

Before dyeing, the textile fabric is preferably scoured in the presence of: 1 g./l of Anionic UN 100 (trademark for a nonionic detergent produced by Montedison), 1–2 g./l of trisodium phosphate, initially at 30° C. and then for 40 minutes at 80° C.

DESCRIPTION OF THE PREFERRED EMBODIMENTS

The following examples are given to illustrate the present invention by comparing the dyes of the invention with the most efficient dyes known to the Art.

EXAMPLE 1

100 g. of a texturized and very streaked nylon fabric in the form of tubular stockings, which had been previously scoured, were placed into a dyeing bath containing 0.3 g./l of monosodium phosphate and 1.7 g./l of disodium phosphate, and treated for 20 minutes at 60° C. Separately, 0.2 g. of a dye having the formula:

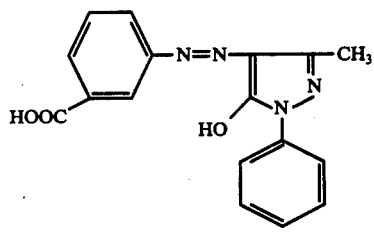

was kneaded with ammonia, dissolved in water, and then admixed, through a screen, to the dyeing bath, making sure that the pH was 8.5 – 9.

The bath was gradually heated to boiling and kept at that temperature for 20 minutes.

Acetic acid was then gradually added to the bath to lower the pH from 6 to 5.5 over 40 minutes and boiling was continued for 30 minutes. The product was repeatedly rinsed and washed.

A perfectly equalized yellow dyeing exhibiting the following stabilities was thus obtained:
stability to sunlight: 5
stability to washing at 60° C. (UNI): 4/4 - 5/4 - 5
where the first number indicates the change in color shade, the second number the discoloring on nylon, the third number the discoloring on wool.

EXAMPLE 2

The procedures of Example 1 were repeated, except that a dye having the following structure was used:

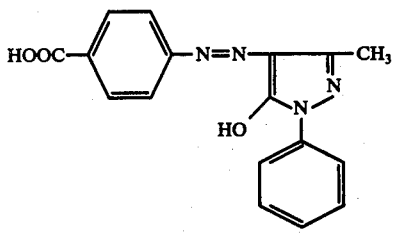

A perfectly equalized yellow dyeing exhibiting the following stabilities was thus obtained:
stability to sunlight: 5/6
stability to washing at 60° C. (UNI): 4/4 - 5/4 - 5.

EXAMPLE 3

The procedures of Example 1 were repeated, except that a dye having the following structure was used:

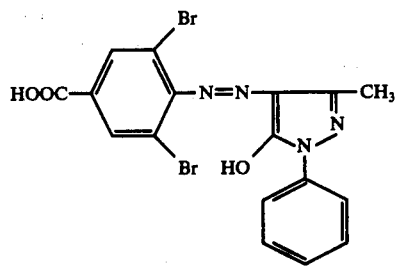

A perfectly equalized yellow dyeing exhibiting the following stabilities was thus obtained:
stability to sunlight: 5
stability to washing at 60° C. (UNI): 4/4 - 5/4 - 5.

EXAMPLE 4

The procedures of Example 1 were repeated except that a dye having the following structure was used:

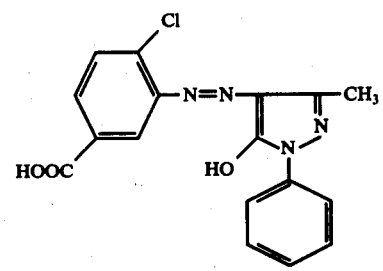

A perfectly equalized yellow dyeing having the following stabilities was obtained:
stability to sunlight: 5/6
stability to washing to 60° C. (UNI): 4/4 - 5/4 - 5.

EXAMPLE 5

The procedures of Example 1 were repeated, except that a dye having the following structure was used:

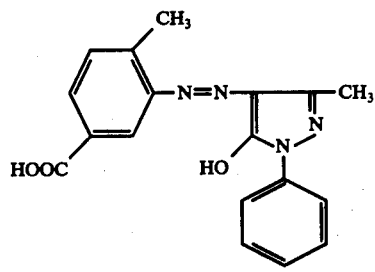

A perfectly equalized yellow dyeing having the following stabilities was thus obtained:
stability to sunlight: 4/5
stability to washing at 60° C. (UNI): 4/4 - 5/4 - 5.

EXAMPLE 6 (Comparative Example)

100 g. of the same texturized nylon fabric as was used in Example 1 was introduced into a dyeing bath containing 0.3 g./l of monosodium phosphate and 1.7 g./l of disodium phosphate.

Separately, 0.8 g. of Yellow Nailamide ER (C.I. Acid Yellow 25, No. 18835) dissolved in water was admixed to the dyeing bath, while adjusting the pH value to 8.5 – 9 by the addition of ammonia, if necessary. The bath was slowly heated to boiling and kept thereat for 20 minutes. Acetic acid was then gradually added until the pH value decreased from 6 to 5.5 in 40 minutes, with boiling being allowed to continue for a further 30 minutes. The fabric was repeatedly rinse and washed. The resulting yellow dyeing exhibited quite evident streaks denoting the limited equalizing power of the dye on the material being tested. The stabilities were as follows:
 stability to sunlight: 6
 stability to washing at 60° C.: 4-5/4-5/4-5.

EXAMPLE 7 (Comparative Example)

100 g. of the same texturized nylon fabric as was used in Example 1, and which were previously scoured, were introduced into a dyeing bath containing 1 g./l of Emulson ELU (Trademark of a Montedison non-ionic type auxiliary product), the pH value having been adjusted to 5.5 by the addition of acetic acid. Separately, 0.6 g. of Microsetile Yellow 5R (C.I. Disperse Yellow 7, No. 26090) was dispersed and then added, through a screen to the dyeing bath, the whole of which was slowly heated to boiling, said boiling being continued for 60 minutes. The fabric was repeatedly rinsed and thoroughly washed.

A well equalized yellow dyeing comparable to that of Example 1 and substantially better than that of Example 6 was obtained, the stabilities of which were as follows:
 stability to sunlight: 5/6
 stability to washing at 60° C.: 4/2/4 - 5.

It should be noted that the fastnesses to wet-treatments in this example were considerably lower than those of the preceding Examples.

Variations and modifications can, of course be made without departing from the spirit and scope of the invention.

Having described our invention, what we desire to secure by Letters Patent and hereby claim is:

1. A process for imparting an equalized yellow shade to streaked polyamide fibers comprising dyeing said fibers with a dyestuff having the formula:

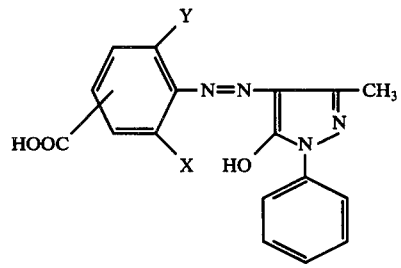

wherein X is hydrogen or bromine, Y is hydrogen, chlorine, bromine or methyl and the —COOH group is meta or para with respect to the azo group in an aqueous bath having a pH value between 8.5 and 9, heating the bath to boiling and then decreasing the pH value to between 5 and 6.5 by adding acetic acid.

* * * * *

UNITED STATES PATENT OFFICE
CERTIFICATE OF CORRECTION

Patent No. 4,062,645                    Dated  12/13/77

Inventor(s) Roberto Cipolli et al

It is certified that error appears in the above-identified patent and that said Letters Patent are hereby corrected as shown below:

Title page, after filing date: should read
-- [30] Foreign Application Priority Data
    Italy, No. 23569/75    5/21/75    --.

Column 1, line 15: "dyestuff" should read -- dyestuffs --;
line 55: "dyes" should read -- dyed --.

Column 5, line 4: "was" should read -- were --; line 15: "rinse" should read -- rinsed --.

Signed and Sealed this

*Second* Day of *May 1978*

[SEAL]

Attest:

RUTH C. MASON
*Attesting Officer*

LUTRELLE F. PARKER
*Acting Commissioner of Patents and Trademarks*